US009618760B2

(12) United States Patent
Cornford

(10) Patent No.: US 9,618,760 B2
(45) Date of Patent: Apr. 11, 2017

(54) COLLAPSIBLE QUASI 3D STEREOSCOPIC DISPLAY AND COVER

(71) Applicant: Alan Bruce Cornford, West Vancouver (CA)

(72) Inventor: Alan Bruce Cornford, West Vancouver (CA)

(*) Notice: Subject to any disclaimer, the term of this patent is extended or adjusted under 35 U.S.C. 154(b) by 297 days.

(21) Appl. No.: 14/287,025

(22) Filed: May 24, 2014

(65) Prior Publication Data

US 2015/0338674 A1 Nov. 26, 2015

(51) Int. Cl.
*G02B 27/22* (2006.01)
*G03B 21/56* (2006.01)
*G02B 7/02* (2006.01)

(52) U.S. Cl.
CPC ......... *G02B 27/2292* (2013.01); *G02B 27/22* (2013.01); *G02B 27/2257* (2013.01)

(58) Field of Classification Search
CPC .. G02B 27/22; G02B 27/2235; G02B 27/106; G02B 27/143; G02B 27/144; G02B 27/2271; G02B 27/2292; G02B 27/28; G03B 21/28; G03B 21/58; G03B 37/04; A47F 11/10; G03H 1/22; H04N 13/0402; H04N 13/0488; H04N 9/3147
USPC ...... 359/23, 443, 462, 477, 479, 817; 353/7, 353/30, 98; 345/1.3
See application file for complete search history.

(56) References Cited

U.S. PATENT DOCUMENTS

| | | | | |
|---|---|---|---|---|
| 6,141,145 A * | 10/2000 | Nalwa | ........... | G02B 27/22 348/36 |
| 7,490,941 B2 * | 2/2009 | Mintz | ........... | G02B 27/2285 349/30 |
| 8,007,109 B2 * | 8/2011 | Hong | ........... | G02B 27/22 353/10 |
| 8,976,170 B2 * | 3/2015 | Lee | ........... | H04N 13/0443 345/419 |
| 2008/0144175 A1 * | 6/2008 | Simonsen | ........... | A47F 11/10 359/479 |
| 2008/0218854 A1 * | 9/2008 | Hoshino | ........... | G02B 27/2235 359/462 |
| 2009/0116106 A1 * | 5/2009 | Adams | ........... | G03B 21/58 359/443 |
| 2011/0002038 A1 * | 1/2011 | Wang | ........... | G02B 27/2292 359/479 |
| 2011/0234981 A1 * | 9/2011 | Wang | ........... | G02B 27/2235 353/10 |
| 2012/0314285 A1 * | 12/2012 | Wang | ........... | G03B 21/58 359/444 |

(Continued)

OTHER PUBLICATIONS

HOLHO. "HOLHO converts smartphone or tablet into a 'holographic' projector". https://www.youtube.com/watch?v=avnsvPsRLfU. Available to the public as of Aug. 11, 2013, as shown by archival copy: http://web.archive.org/web/20150919094710/https://www.youtube.com/watch?v=avnsvPsRLfU.*

(Continued)

*Primary Examiner* — Bumsuk Won
*Assistant Examiner* — Collin X Beatty

(57) ABSTRACT

A collapsible 'quasi 3D' stereoscopic display device and method of construction for quick automatic deployment for use with a mobile smart device at any time and place and folding for storage within a mobile communication device (phone, tablet, portable computer) thin cover carrying case or other thin storage device.

10 Claims, 12 Drawing Sheets

(56) References Cited

U.S. PATENT DOCUMENTS

2014/0049448 A1* 2/2014 Christensen ............ G09F 19/12
345/1.3
2015/0261004 A1* 9/2015 Chen .................. G02B 27/2271
359/477

OTHER PUBLICATIONS

Siang. "How to create simple hologram with cd case n iPad". https://www.youtube.com/watch?v=gp4ltD_EK-A. Available to the public as of Nov. 11, 2011, as shown by archival copy: http://web.archive.org/web/20160401042627/https://www.youtube.com/watch?v=gp41tD_EK-A.*

* cited by examiner

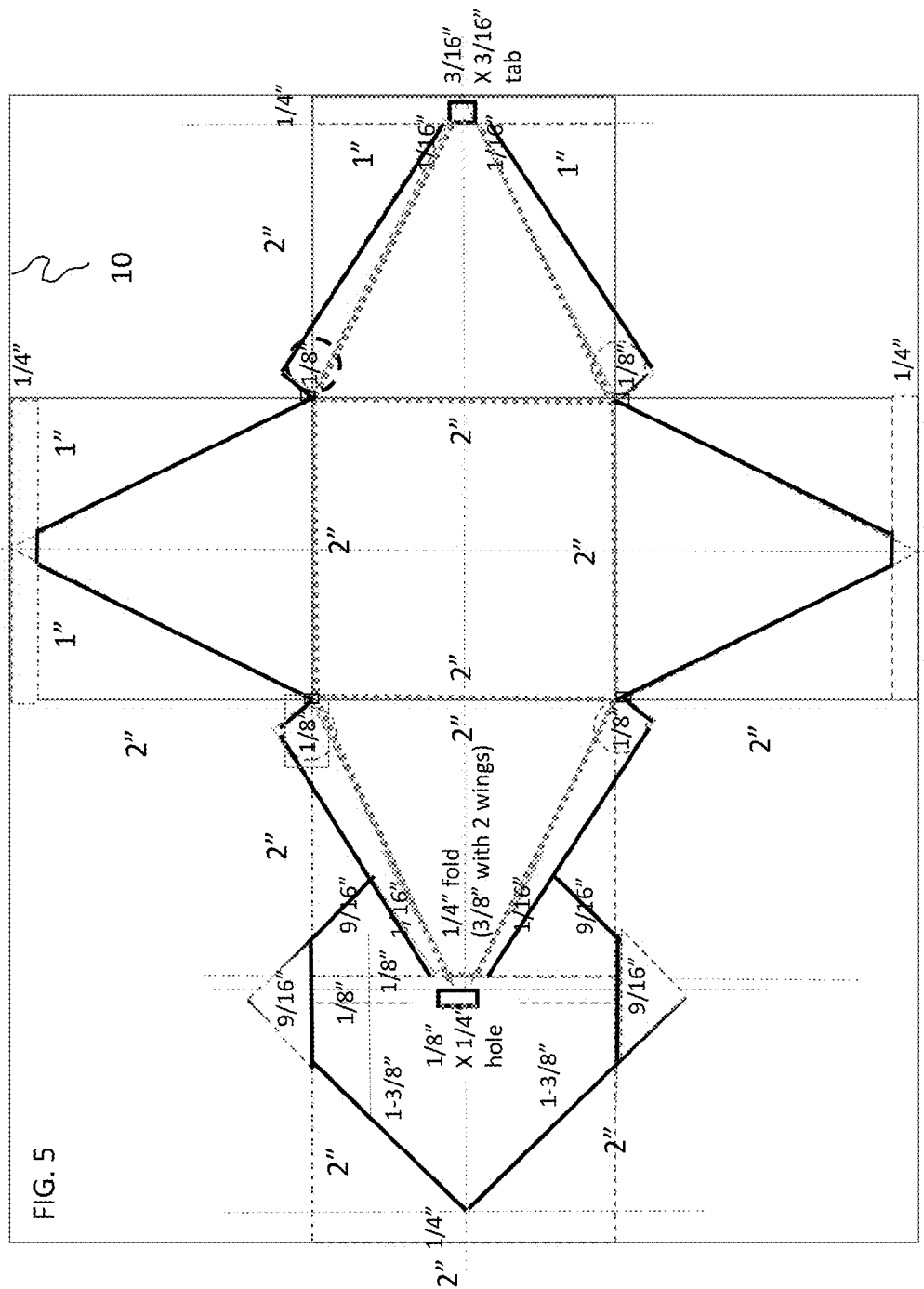

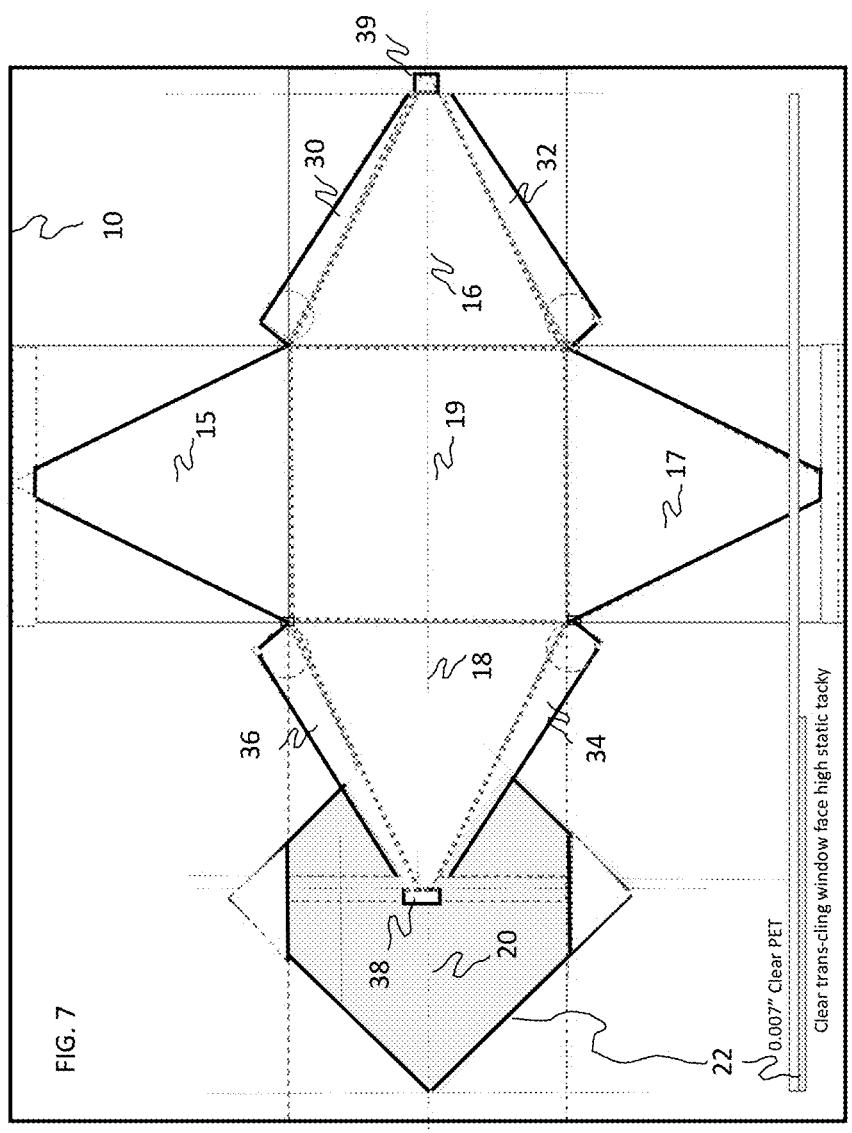

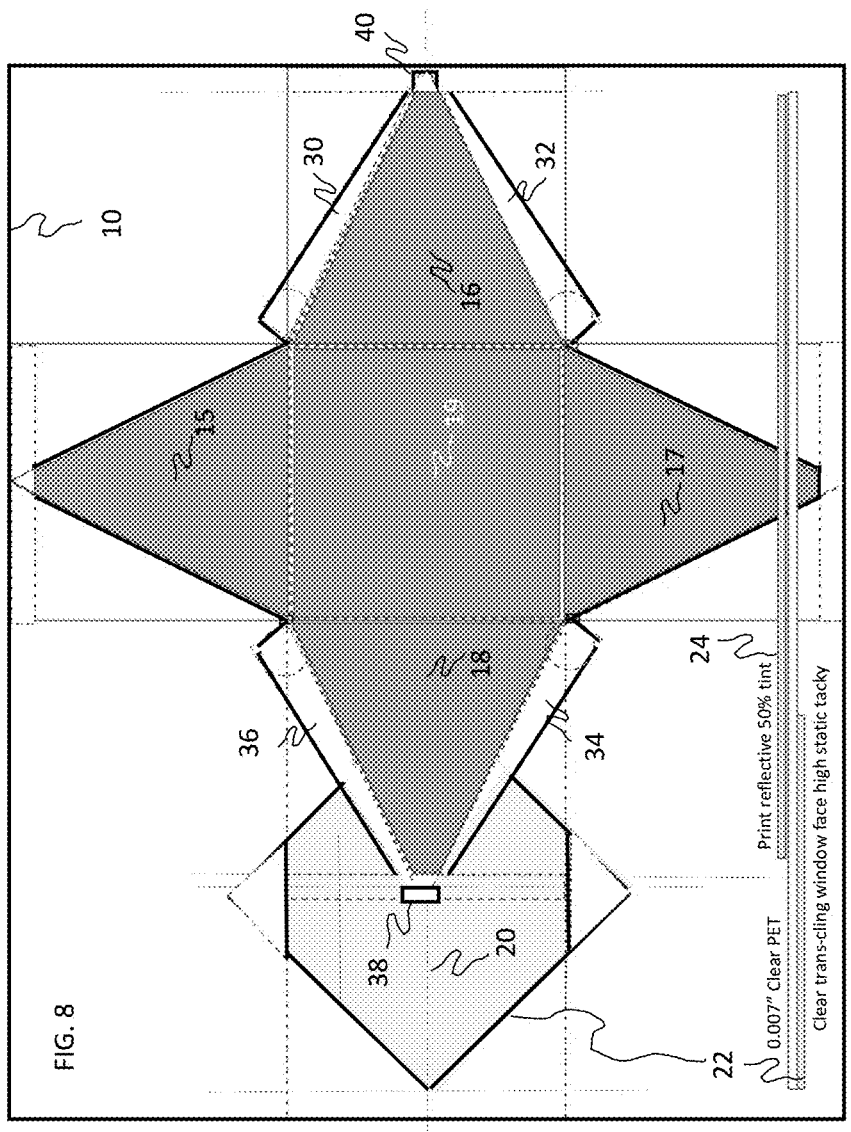

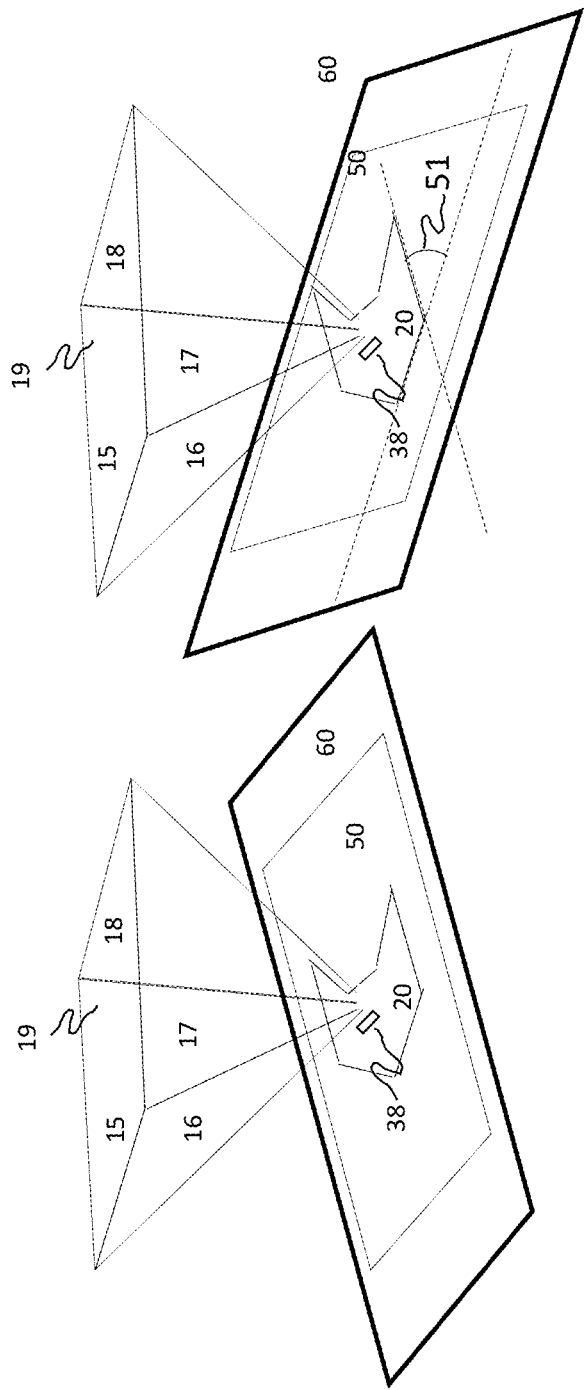

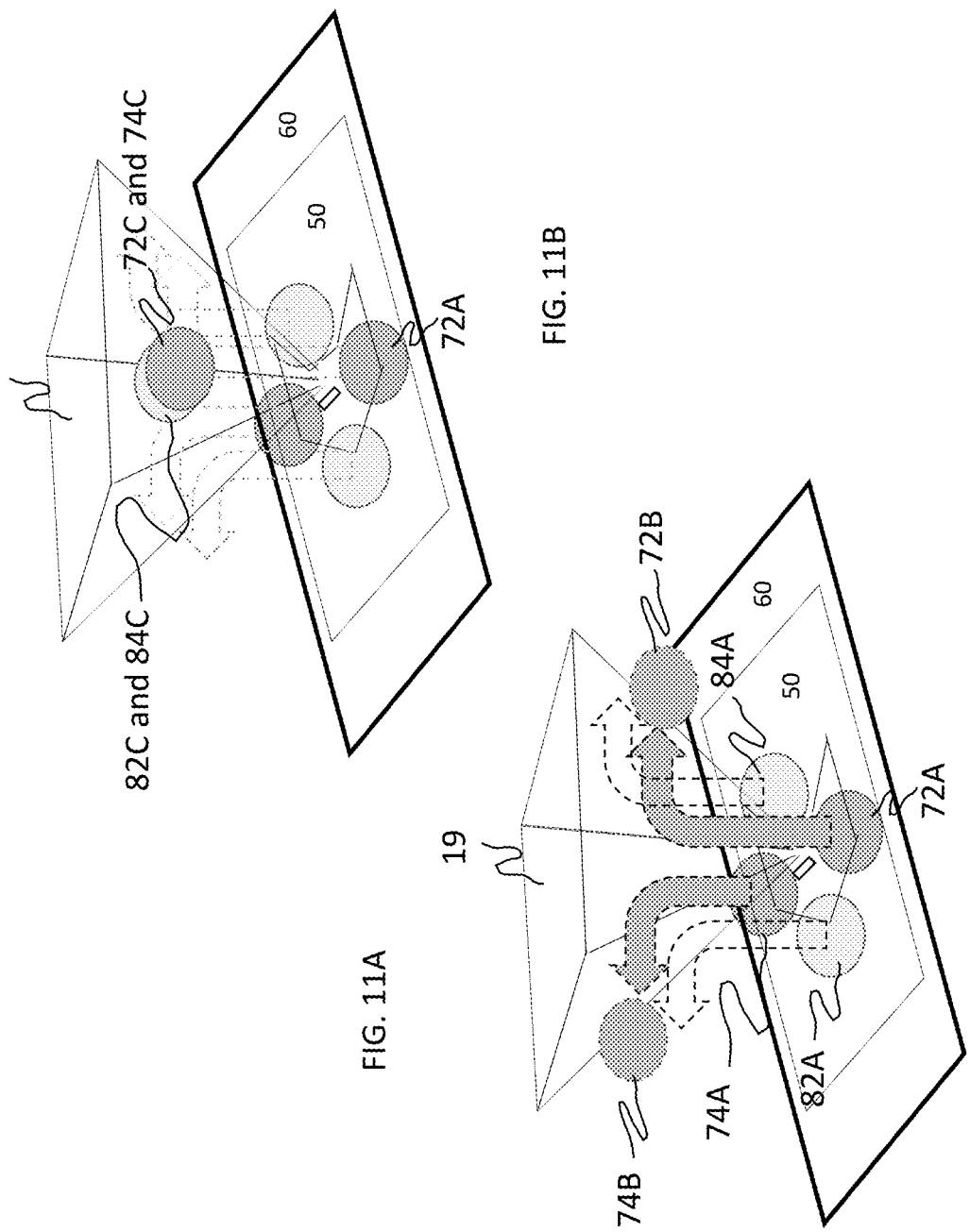

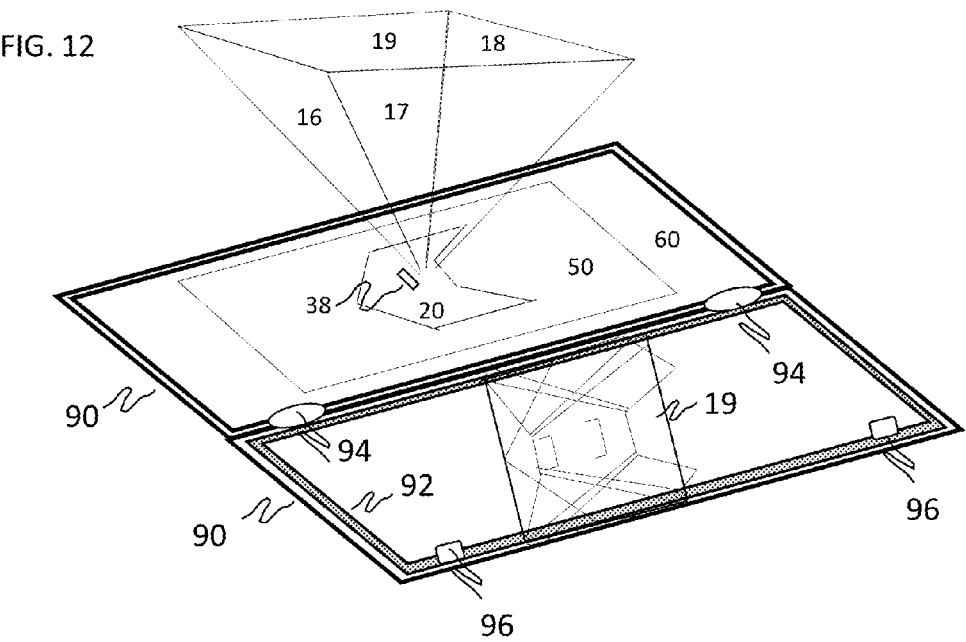

COLLAPSIBLE QUASI 3D STEREOSCOPIC DISPLAY AND COVER

This Non-Provisional Application claims priority benefit of the earlier filing date of May 24, 2013 of Provisional Application 61/827,113 of the invention Collapsible Q3D Display and Cover, confirmation Number 1010 by Alan Bruce Cornford.

BACKGROUND

Field of the Invention

An increasing number of optical devices and methods are being developed for delivering augmented reality and 'real world' enhanced two dimensional (2.5D), '3D-like' or 'quasi three dimensional' (Q3D) and three dimensional (3D) viewing experiences. These may be generally described as being stereoscopic and may involve optical effects including mirror images, Peppers Ghost and 'holographic-like' effects or optical impressions where images of objects may appear to be real and/or to float and interact in space.

These devices and methods all apply the basic laws of physics, optics and the mathematics of light propagation, reflection, refraction, diffraction, attenuation, magnification, redirection, focus and multi-light beam interaction. These laws are well known and widely practiced in the public domain especially in a very wide array of spectroscopic instruments, telescopes, microscopes, cameras, glasses and projectors used for research, art, gaming and communications.

3D and Q3D image display devices utilize various numbers (from 1 to 'n') and orientations of transparent, semi-transparent, translucent or opaque reflective planes or curved surfaces (called 'facets') in 'n' dimensions to create stereoscopic or 3D-like images from one or more 2D images or combinations of 2D images. These facets comprise single sheets, several 2D sheets, V's, triangles, squares, rectangles rhombuses, pyramids, pyramoids, tetrahedrons, diamonds and other conformations of 'n' sided polygons.

The devices use a wide array of light sources, combinations of light sources and light source optical alignments using display media of one or more, or combinations of gaseous vapors and particulate dispersions, liquid media and solid opaque reflective mirrors, transparent, semi-transparent, and/or translucent surfaces, films and other media fabricated of metals, glasses, plastics, polymers, gases and other chemicals all of which are described in the prior art.

Examples of Prior Art

A number of prior art patent applications and patents teach examples of optical display devices for producing quasi-3D images or impressions of such images. A series of patent applications and patents by P. Simonsen et al.—US 20080144175 19.06.2008 and 20080144175; WO/2006/079341 03.06.2006; EP 1846798 24.10.2007; KR1020070111495 21.11.2007 teach a Display Device For Producing Quasi-Three-Dimensional Images where the pyramid-like part has semi-transparent, partly reflective facets and the display means provides images to be reflected on the facets of the pyramid-like part; WO/2013/044011, PCT/US 2012/056542 by Christensen, assigned to 360 Brandvision LLC teaches a Device and method for Omnidirectional Image Display; Patent Application No. 29/332,917—Jun. 8, 2010 Publication Number U.S. D0617361 S1 by Simonsen and Christensen, assigned to RealFiction teaches a 3D imaging device; WO/2013/052789 (PCT/US 2012/058935) by Gray assigned to Amazon Tech Inc. teaches a Multi-dimensional interface for image display; U.S. D662533 by Hsiung and Chang of Innovision Labs teaches an Image device for projecting floating images in the air and US 20110037834 by Hsiung and Chang teaches an Imaging device for generating and displaying images to simulate movement of three-dimensional objects; U.S. Pat. No. 7,057,581, June 2006 by Knabenbauer assigned to IBM teaches a Three-dimensional display apparatus.

This prior art teaches display devices constructed and composed of many rigid construction material components for displays that most often remain permanently in their display conformation. All apply well know optical physics and means of optical reflection for generating images from mirrors or polygon display facets. This prior art does not teach devices or device construction methods for specifically producing readily foldable/collapsible conformations that may automatically deploy, fold and redeploy as 'quasi 3D' (Q3D) polygon display devices well suited for mobile use, easy transport and storage either with the smart device or in a thin carrying case or in a small pocket wallet or purse of a size used for credit cards and thin planar objects.

The prior art does not teach the design and method of construction of foldable/collapsible Q3D polygon display devices utilizing only a single piece of foldable material that may be formed into a polygon, which may then be subsequently folded/flattened for storage after which the device will automatically reassume its polygon shape based largely upon its own material elasticity and shape-memory. No prior art teaches such a foldable Q3D device that is specifically designed for storage and transport in the cover of mobile telecommunications devices or thin wallet pouches.

INTRODUCTION

Key objectives for augmented reality devices include minimal size for mobile use, transport and storage, affordability and novelty of experience. A few of the more expensive wearable devices include Oculus VR, and Google glass which are now available but largely unaffordable for the general population.

This invention provides a very affordable mobile augmented reality experience delivered in connection with smart devices. The display device may be commercially mass produced very quickly at very low cost or produced as 'do-it-yourself' (DIY) from a simple pattern design using readily available plastic materials that may be cut and folded to preferred conformation shapes.

This invention teaches a device and method for its construction and deployment in the form of a polygon that displays stereoscopic 'quasi 3D' images from a single thin piece of transparent, semi-transparent or opaque reflective, elastic, shape-memory material that may be cut with scissors or a die, creased and folded very precisely to a polygon shape for image display. This polygon conformation may be easily collapsed by applying pressure with the palm of the hand to produce a thin folded planar configuration that may be stored inside a thin smartphone cover or wallet pouch that maintains folding pressure.

When the folded conformation is removed from the smartphone cover holder or wallet pouch, the folding pressure is released and the elastic shape-memory properties of the material make the material automatically 'pop back' and revert to the multi-faceted polygon conformation which may then be placed on a smart device and used as a display. The material elastic properties permit this folding and automatic unfolding to occur many times for repeated storage and reuse. In one embodiment the material is clear plastic (one of Transilwrap 007 or 010 clear polyester plastic); the tacky material is clear Transcling window face high static tacky and cutting and creasing is by a Pacific Bindery steel die).

The display device sits on and may be temporarily 'tacky' affixed to the screen surface of a smart device so that the device may be tilted without dislodging the display during use. The device is easily removed after use by pulling it gently by hand upward and away from the screen surface until the 'tacky' adhesive effect of the polygon foot attached to the screen is overcome and the polygon releases from the smart device surface.

A smart device (smartphone, tablet, portable computer) serves as both a light source and 2D image source for the display. The power and electronics of the smart device may also be used to operate automatic light attenuation, sound and other electronic functions applied to the device to enhance the Q3D experiences. A software program operating on the smart device is used to identify, select, center and split 2D images that are displayed on the smart device to generate Q3D experiences with the display. These Q3D experiences that appear to be in the interior of the display are best viewed horizontally from a side perspective and from any side of the polygon display that may be rotated to enhance the Q3D experiences shown in FIGS. 11A and 11B. The software also functions to split 2D images into sets of mirror images that equal the number of facets of the display polygon and orients these at 45 degrees to the rectangular orientation of the smart device screen to optimize the Q3D image size experience.

The display is oriented on the surface screen of the smart device so the polygon facets are directly opposite the mirror images on the smart device screen.

The display device, its method of construction and its method of automatic deployment and re-deployment are all unique to this invention. These are not taught or practiced in the prior art. There are many examples of optical methods for creating Q3D images with planar surfaces, mirrors and multifaceted polygons and pyramoids that are taught in the prior art and these methods and devices are not claimed in this invention.

BRIEF DESCRIPTION OF THE DRAWINGS

FIG. 5 shows the dimensions for one embodiment of all of these features representing a tetrahedral polygon with a 2"×2" top 19.

FIG. 7 shows a 'tacky' layer applied to the foot 20 (one example being clear trans-cling window face high tacky from Transilwrap) for non-permanent and easy removal of the foot from a smart device screen.

FIG. 8 shows different surfaces and/or chemicals or material laminates on the top 19 and faces 15, 16, 17 and 18 of the polygon conformation. This material can be a mylar, a soluble conducting polymer for detecting and electronically controlling ambient light intensity, or other substrates to deliver desired effects on ambient light or light intensity within the polygon;

FIG. 9A shows a side view of the display in the polygon conformation placed on the screen 50 of a smart device 60.

FIG. 9B shows the polygon oriented at 45 degrees to the screen orientation 51.

FIG. 11A shows the source split images 72A and 74A, 82A and 84A and the respective reflected images 72B and 74B, and 82B and 84B off the polygon faces. FIG. 11B shows the quasi3D image effect where these (mirror) images 72C and 74C, and 82C and 84C that appear to be inside the interior of the polygon just as a mirror image appears to be inside the mirror.

FIG. 12 shows the display device in the planar conformation stored in an inner cover 90 of a smart device 60 with the cover shown open beside the smart device. The figure also shows the display device in the polygon confirmation placed on the screen 50 of the smart device 60 with the cover 90 of the smart device open.

DETAILED DESCRIPTION

The display device is constructed of a single thin piece of transparent, semi-transparent or opaque reflective shape-memory material that may be cut, creased and folded precisely according to a specific design to form a multi-dimensional polygon conformation wherein the polygon faces serve as reflective facets or mirrors for images that shine on them creating the impression that the images reflected from all polygon faces appear to reside as quasi 3D images within the interior of the polygon. The operational polygon conformation of the device is easily collapsed to a thin folded planar conformation by applying pressure to the polygon top surface and this folded planar configuration is stored inside a thin smartphone cover or in a separate thin wallet pouch for maintaining folding pressure, the elasticity and shape-memory of the device material causing the folded planar conformation to automatically revert to the polygon conformation by eliminating the folding pressure on the flat planar conformation by removing it from the storage cover.

Design

Figure 1:
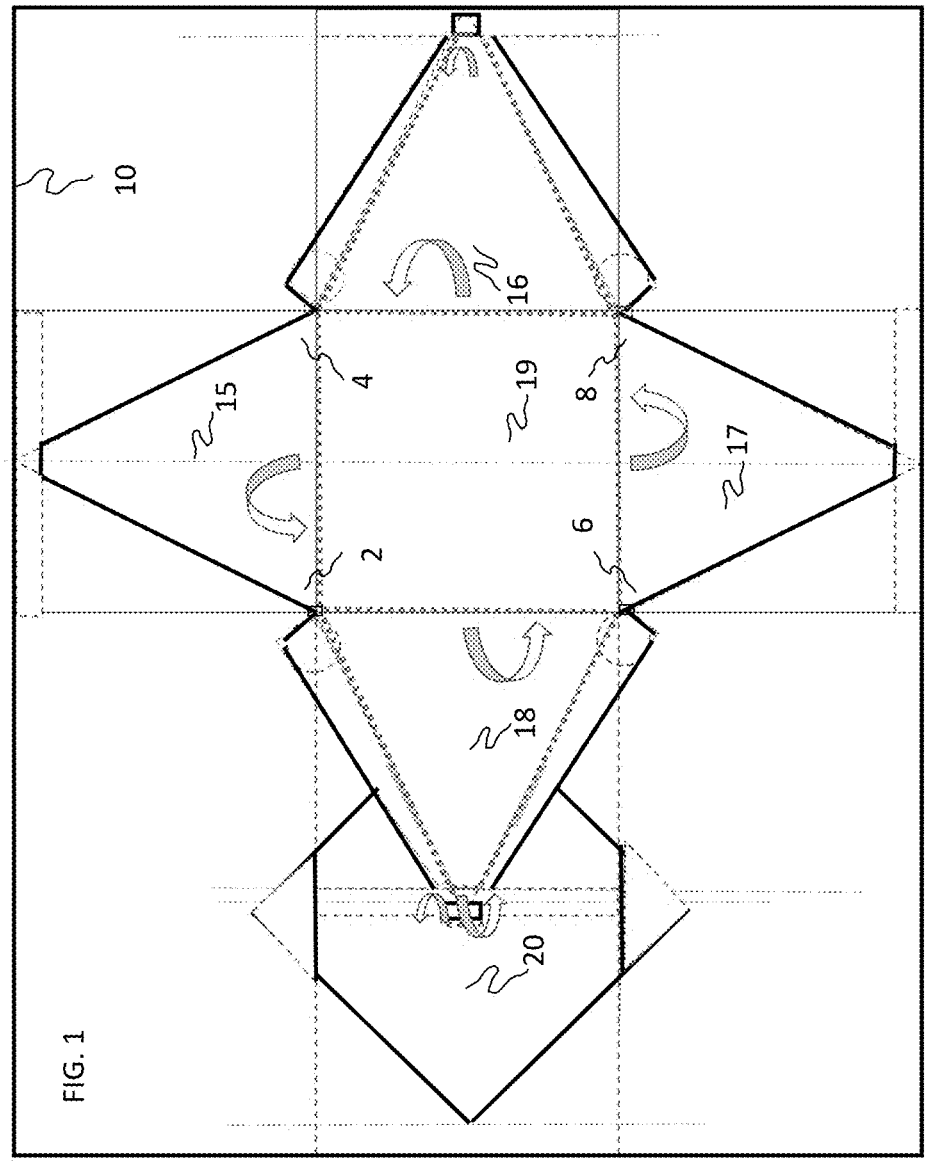
FIG. 1 shows the single piece of transparent, semi-transparent or opaque reflective stock material 10 from which the device design is cut, creased and folded. The embodiment in this figure will produce a polygon with 4 faces 15, 16, 17 and 18, a top 19 and a foot 20. The outside cut line is the solid black line and the crease and fold lines are the dotted lines.

The device design is purposefully simple and robust. It can be easily produced, repeatedly re-assembled and re-folded without significant damage and survive rough treatment and repeated squashing without significant loss of utility. The device is designed as a single unit so that it can be produced via a single die that cuts and creases one thin piece of material 10, as shown in FIG. 1. This single piece of cut material is then folded along the crease lines into an inverted polygon configuration that serves as a stereoscopic display when utilized with a smart phone, tablet or mobile computer as shown in FIG. 9.

The design dimensions and angles are precisely defined as shown in FIGS. 1-4 and the cutting, creasing and folding procedures must be performed accurately for best effect. While very accurate die cutting is a preferred means of cutting and creasing, a pair of scissors used with care and creasing and folding against a straight ruler will produce good results.

In a preferred embodiment, the polygon has 4 faces that are all adjoined on one side to a square top 19. The angles 2, 4, 6 and 8 between the polygon faces 15, 16, 17 and 18 and the top 19 may range between 33 and 75 degrees. In preferred embodiments, these angles and the angle between the faces and the top when in the polygon configuration, are much closer to 43 degrees and 51 degrees similar to angles in the Egyptian pyramids and 60 degrees in isosceles triangles. FIG. 5 shows a set of dimensions of one embodiment with a square top 19 that is 2"×2" for deployment on a smart phone Construction Materials The primary construction material may be transparent, semi-transparent or opaque with a highly reflective surface. For best effect the material should have high elasticity and shape-memory so that it will return to a prior folded conformation when pressure on it is relaxed or removed. Preferred materials are plastics and plastic laminates but any material with the general characteristics defined in this invention may be used. Best material thickness (for plastics) generally ranges between 005 and 015 thousands of an inch (shown in FIG. 7) This thickness provides flexibility but also enough rigidity so the faces of the polygon surfaces remain planar when the material is creased and folded.

Construction and Operation Method

Figure 4:
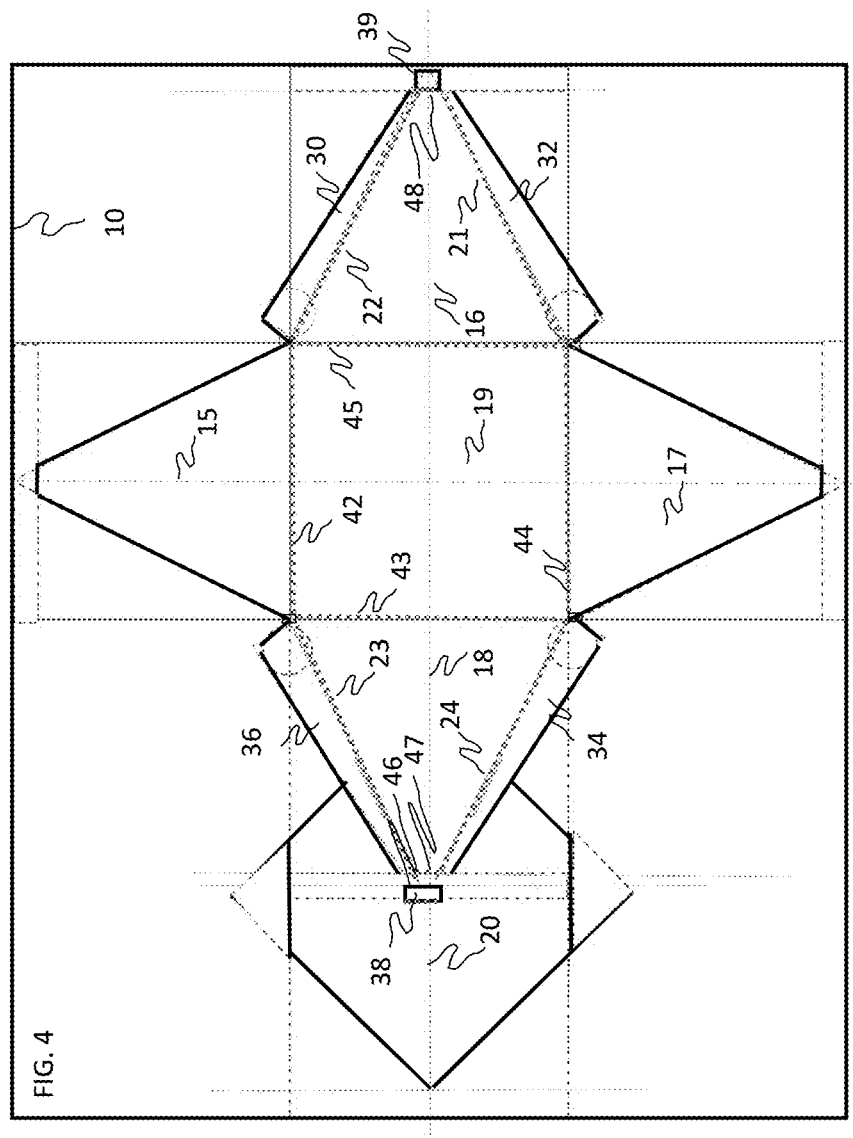
FIG. 4 shows all of these features together.
Figure 6A:
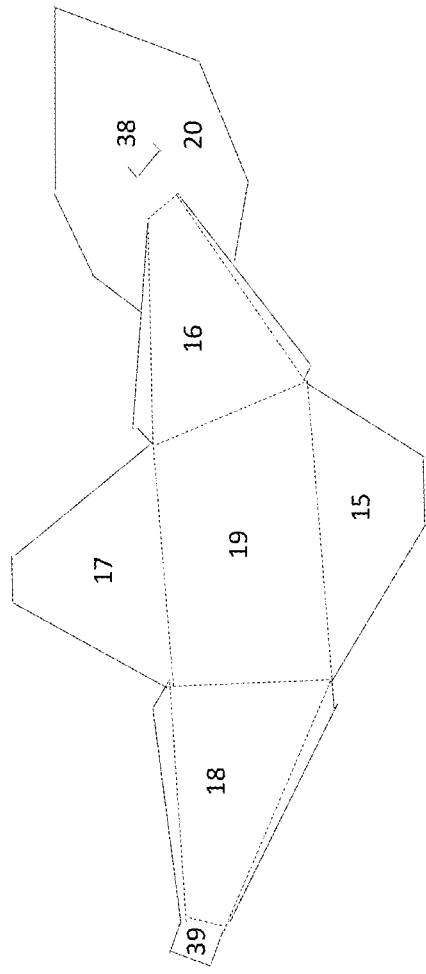
FIG. 6A shows an example die cut of the embodiment in FIG. 5 with the partial folding effect of the creases as the design exits the die.
Figure 6B:
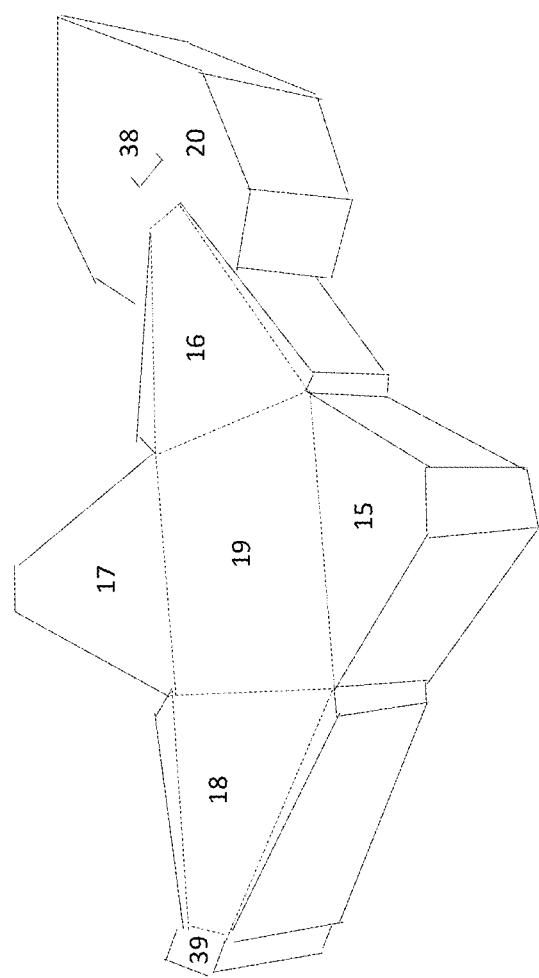
FIG. 6B shows a stack of 50 die cut and creased pieces

The design is placed over the stock sheet material and transferred to it by tracing, stencil or other suitable means. If a die is made, then the die knife design will conform to the display design both for the outside cuts and the inner creases and folds as shown in FIG. 4. A die cutout (or scissor cut out) of the design is shown in FIG. 6A.

Figure 2:
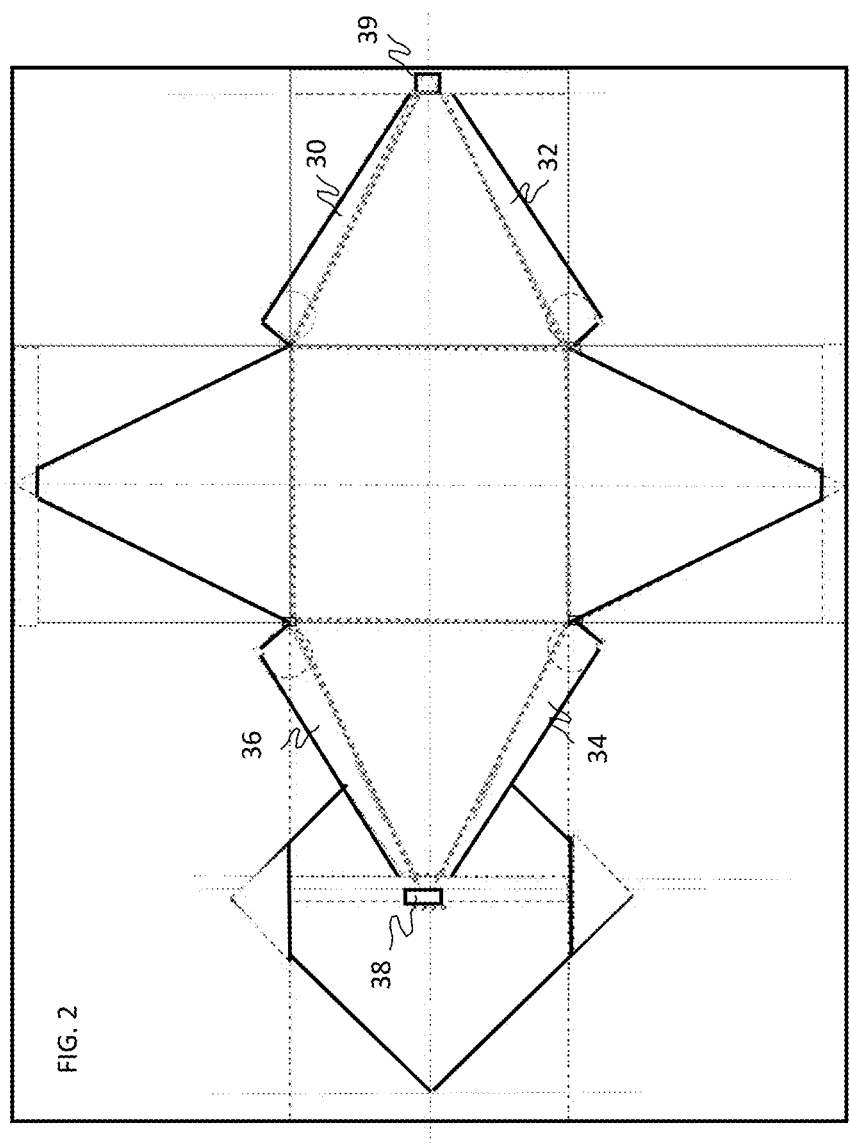
FIG. 2 shows the side positioning flaps 30, 32, 34 and 36 on the sides of faces 16 and 18. These flaps are folded inward by 90 degrees to the plane of the main sheet towards the middle of the design to (i) keep the faces 18 and 16 planar and (ii) to serve as guides against which the outer edges of faces 15 and 17 will rest and will hold them together when these faces are folded inward so their tips remain approximately ¼ inch apart in this embodiment (FIG. 10). This figure also shows a tab 38 that rises up from the plane of the foot 20 leaving a small rectangular hole in the foot 20 into which tab 39 on face 16 inserts when plane 16 folds inward towards plane 18. This tab 39 insertion and alignment occurs automatically when the planar conformation reverts to the polygon configuration and the tab 38 serves as a stop for the plane 16 to assure its positioning and alignment relative to the other faces.
Figure 3:
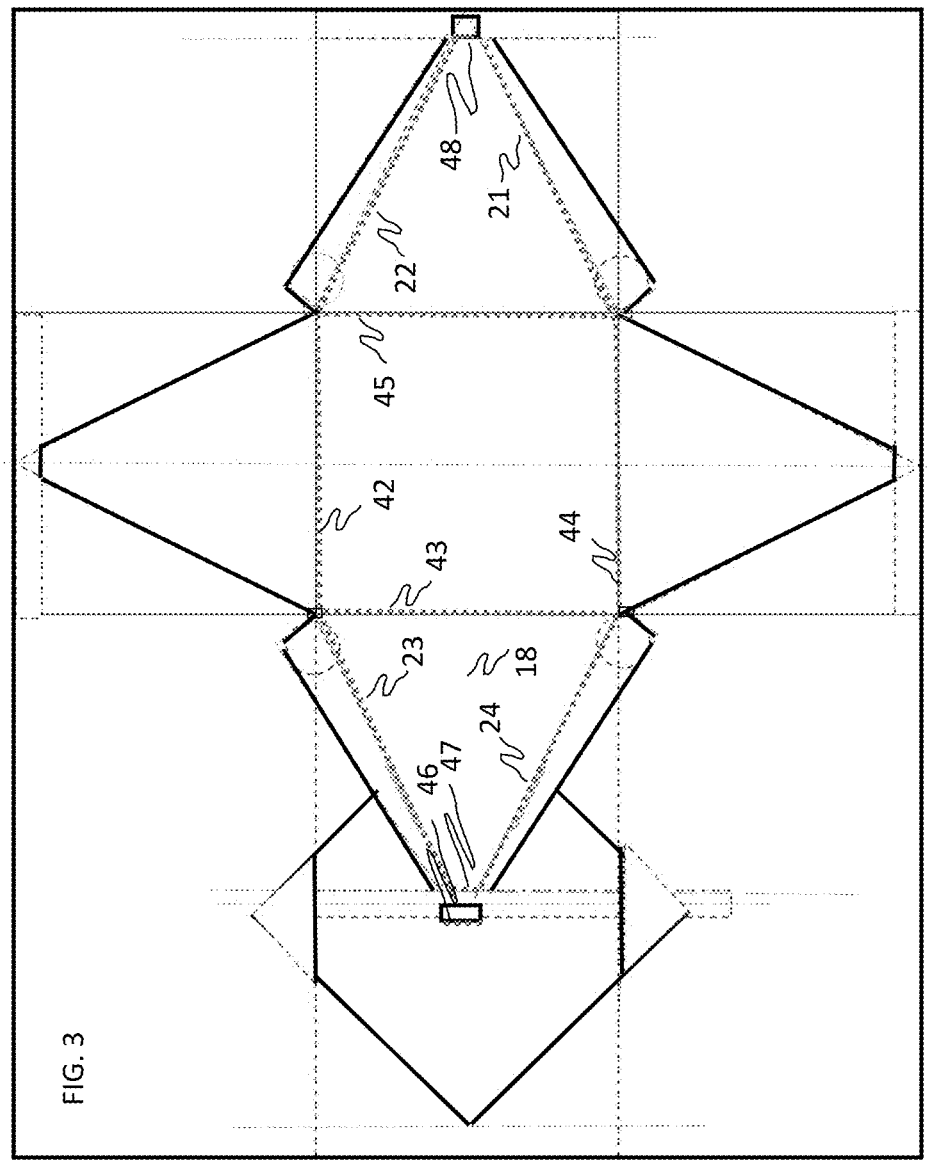
FIG. 3 shows the crease lines (for embodiments that are die cut) that also serve as fold lines for the faces 42, 43, 44 and 45, for positioning flap folds 21, 22, 23 and 24, for the 2 tabs 46 and 48 and for the foot 47.

Then as shown in FIG. 2 the flaps 30, 32, 34 and 36 are first folded inward by 90 degrees to the plane of the material along fold lines 22, 21, 24 and 23 and (i) serving to keep the faces 18 and 16 planar and (ii) also serving as guides against which the outer edges of faces 15 and 17 will rest and will hold them together when these faces are folded inward by about 120 degrees so their tips initially touch.

Then tab 38 is folded along fold line 46 by 30-45 degrees up from the plane of the foot 20 leaving a small rectangular hole in the foot 20 into which tab 39 on face 16 will insert when plane 16 folds inward towards plane 18. This tab 39 insertion occurs automatically when the planar conformation reverts to the polygon configuration and the tab 38 serves as a stop for the plane 16 to assure its positioning and alignment relative to the other faces. Tab 39 is folded inward along fold line 48 towards the plain of the stock by 120 degrees.

Once the flaps and the tabs have been folded, then as shown in FIG. 1, the polygon faces 15 and 17 are folded along fold lines 42 and 44 inward by 180 degrees and with the elasticity of the plastic they will revert to approximately 120 degrees. Face 16 is then folded 180 degrees along fold line 45 and it will revert to about 120 degrees.

Foot 20 is then folded 120 degrees inward along fold line 47 (also as shown in FIG. 1). Finally face 18 with foot 20 attached is folded 180 degrees along fold line 43 over top of all three of the other faces. When this face relaxes back to about 120 degrees the tab 39 on face 16 will automatically catch and lock in to the rectangular hole in foot 20 that was generated by tab 38. If this does not occur on the first try, then each of the faces, 15 and 17, and then face 16 and 18 should be refolded inward until the tab 39 properly seats in the hole under tab 38.

To enhance the operating characteristics of the display other surfaces may be applied or laminated to the plastic stock as shown in FIG. 8. The may be applied to the polygon faces and the top to obtain desired effects such as light attenuation or enhancement or other effects. They may change the folding and shape memory properties of the plastic. The top 19 may be made opaque and logos, messages and other calligraphy or static images applied without effect on the operation of the display which is normally viewed from a side and not from the top down.

A piece of 'tacky' plastic 22 as shown in FIG. 7 may be cut to the dimensions of the foot 20 and applied to the underside of the foot 20. Alternatively 'tacky' non-permanent stick spray may be applied to the underside of foot 20. The display in this polygon conformation may then be placed on a smart device 60 screen 50 in either of the orientations shown in FIG. 9A or 9B. The optimal orientation is shown in 9B where the angle 51 is 45 degrees to side of the screen 50.

Figure 10:
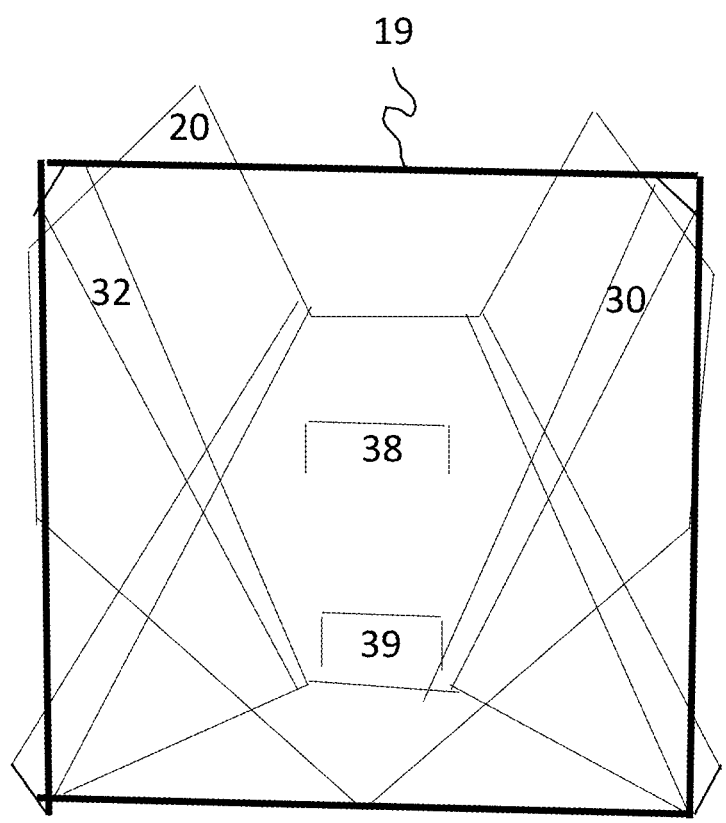
FIG. 10 shows the folded planar conformation top view looking down through the clear top 19.

The polygon conformation may be readily folded to a planar conformation by applying the pressure of the palm of a hand on top 19 and pressing down gently to push 19 towards the foot 20. The tab 39 will retract from the slot below tab 38 and the polygon faces collapse inward to form the planar conformation shown in FIG. 10. Pressure may continue to be applied (to resist the elastic shape memory characteristics of the plastic) by placing the folded planar conformation in a cover or wallet. FIG. 12 shows this planar conformation in a smart device cover 90 and held by an insert ring 92 that covers at least two edges of the folded device and is held in place by snaps 96. When the snaps 96 are released then the insert ring 92 is released to fold over the smart device via hinges 94 and release the display to revert to the polygon conformation for positioning on the display screen. Variations of the ring 92 may be designed (such as by addition of a cross) to hold the foot in place when in use on the screen eliminating the need for applying a tacky adhesive.

Although the description herein has been made with reference to particular embodiments, it is to be understood that that these embodiments are merely illustrative of the principles and applications of the present invention disclosure. It is therefore to be understood that numerous modifications may be made to the illustrative embodiments and that other arrangements may be devised without departing from the spirit and scope of the present disclosure as defined by the claims herein.

The invention claimed is:

1. A portable display device constructed of a single thin piece of transparent or semi-transparent shape-memory material comprising:

a plurality of polygonal facets including a top polygonal facet, the plurality of polygonal facets arranged in a symmetric geometry configured to receive a projected image and provide a 3D perception of the projected image at a location between each of the plurality of polygonal facets, wherein the angle between any two polygonal facets is either 43 degrees or 51 degrees, the plurality of polygonal facets comprising:
a plurality of side flaps, wherein at least one of the plurality of side flaps is provided with a first tab, and wherein the side flaps guide and position the plurality of polygonal facets' outer edges; and
a foot which is formed integrally of the single thin piece of shape-memory material, the foot comprising:
a second tab and a hole configured to receive the first tab, wherein the second tab serves as a stop for at least one of the side flaps thereby assuring alignment of the plurality of polygonal facets; and
wherein a pressure on the top polygonal facet collapses the plurality of polygonal facets to a planar conformation,
wherein the shape-memory material causes the polygonal facets to return to the symmetric geometry in the absence of the pressure.

2. The display device according to claim 1, wherein the single thin piece of material is polyester plastic.

3. The display device according to claim 1, wherein the top polygonal facet is a 2"×2" square.

4. The display device according to claim 1, wherein the projected image is provided by at least one of a smart phone, tablet, or portable computer.

5. The display device according to claim 1, wherein a thickness of the planar conformation is (n+3) or (n+4) times the thickness of the single thin piece of material, and "n" is the number of the plurality of polygonal facets.

6. The display device according to claim 1, wherein a thickness of the display device is less than 1 cm when the planar conformation is achieved.

7. The display device according to claim 1, wherein the pressure is 0.25 kg/cm$^2$ or less.

8. The display device according to claim 1, wherein the foot further comprises an adhesive layer.

9. The display device according to claim 1, wherein the single thin piece is constructed of polycarbonate.

10. The display device according to claim 1, wherein at least one of the polygonal facets comprises a mylar or soluble conducting polymer configured to detect or control ambient light intensity.

* * * * *